Dec. 30, 1969    P. E. STEMMERMAN ET AL    3,487,448
POWER OPERATED SWINGING DRAWBAR
Filed March 11, 1968

INVENTORS
P. E. STEMMERMAN
A. G. WASCHEK
S. MOON
BY
R L Hollister
AGENT

United States Patent Office 3,487,448
Patented Dec. 30, 1969

3,487,448
POWER OPERATED SWINGING DRAWBAR
Paul Edward Stemmerman, Arvid Gayle Waschek, and Seaton Moon, Cedar Falls, Iowa, assignors to Deere and Company, Moline, Ill., a corporation of Delaware
Filed Mar. 11, 1968, Ser. No. 712,013
Int. Cl. B60d 1/14
U.S. Cl. 280—468      4 Claims

ABSTRACT OF THE DISCLOSURE

A hydraulic actuator which will control the swinging movement of a side shiftable drawbar has its cylinder end connected to a side frame member of the drawbar supporting structure and its rod end connected to the drawbar. To enable the use of a longer cylinder, and thereby increase the length of actuator stroke and the swinging movement of the drawbar, the rod end of the actuator is provided with a rigid link which extends back along the length of the rod and cylinder where it is secured to the drawbar. The link is of a length such that, when the actuator rod is fully retracted and the drawbar is in one of its extreme side positions, the drawbar will cross the cylinder approximately midway along the cylinder length.

BACKGROUND OF THE INVENTION

The present invention relates to improvements in tractor drawbars of the type pivoted to the tractor for transverse swinging movement, and more particularly relates to improved power means for swinging the drawbar from side to side and holding it in any adjusted position.

The uses and advantages of power operated drawbars are exemplified by the following: They make the hooking up of an implement easier; they make changes in the lateral relationship between a tractor and implement more convenient, for example, when changing from operation in the field to transport; they provide improved steering of a towed implement, particularly when backing the implement; shifting of the drawbar from side to side will help a tractor walk through a traction stall; and they improve the maneuvering capabilities of a tractor which is pulling an implement which provides a large draft, for example, a shifting of the drawbar in the direction of a turn causes the draft to assist in the turn.

In order to take advantage of the above-listed uses and advantages, along with other uses and advantages, many designs for power operated swinging drawbars have heretofore been conceived. In one previously known design, a transversely disposed hydraulic actuator was positioned on each side of the swinging drawbar, and the rod end of the actuator would bear against the drawbar to force the drawbar toward the central position. Because of the limited space available between the tractor wheel and the drawbar when the drawbar was shifted to an extreme side position, the length of the actuator cylinder and hence the length of the actuator stroke was limited. Because of the limited stroke length, each actuator could do no more than move the drawbar to the central position. Therefore, the drawbar could not be positively moved from the central position by the hydraulic actuators.

In another previously known design for swinging drawbars, a longitudinally disposed hydraulic actuator was mounted alongside a side frame member of the drawbar supporting structure and a motion-transmitting linkage system was provided between the actuator and the drawbar. The linkage system would consist of a traingular-shaped body member having one corner pivoted to the drawbar supporting structure, a second corner connected to the actuator rod through a rigid link which was pivoted to both the actuator rod and the triangular-shaped body member, and the third corner was connected to the drawbar through a rigid link which was pivoted to both the triangular-shaped body member and the drawbar. The two rigid links were arranged at approximately a right angle to each other so that, as the actuator rod was extended or retracted, one link would pivot the triangular-shaped body member which in turn caused the other link to swing the drawbar from side to side. With this design, the drawbar was always under the control of the hydraulic actuator, but the linkage system which was required had the effect of cluttering the rear end portion of the tractor.

SUMMARY OF THE INVENTION

It is an object of the present invention to provide a power operated swinging drawbar in which the hydraulic actuator is transversely disposed and in which the drawbar is always under the positive control of the actuator so that the actuator can move the drawbar to either side of a central position.

Another object of the present invention is to provide a power operated swinging drawbar with a transversely disposed hydraulic actuator and in which the length of the actuator cylinder is not limited by the space available between the tractor wheel and the drawbar so that the distance which the drawbar can be swung to either side of the central position will not be limited by the length of the actuator stroke.

Still another object of the present invention is to provide a power operated swinging drawbar with a hydraulic actuator in which the length of the actuator cylinder is not limited by the available space between the tractor wheel and drawbar, and which is of extremely simplified construction.

The above objects are accomplished by providing a hydraulic actuator which will control the swinging movement of a side shiftable drawbar, and which has its cylinder end connected to a side frame member of the drawbar supporting structure and its rod end connected to the drawbar. To enable the use of a relatively long hydraulic cylinder, a rigid link is mounted on the actuator rod and extends back along the length of the rod and cylinder where it is secured to the drawbar. The rigid link is of such a length that, when the actuator rod is fully retracted and the drawbar is in one of its extreme side positions, the drawbar will cross the cylinder approximately midway along the cylinder length.

A full understanding of the details of construction of the present invention will be had upon reading the following detailed description in conjunction with the accompanying drawings.

DESCRIPTION OF THE PREFERRED EMBODIMENT

Figures 1, 2, 3, 4:
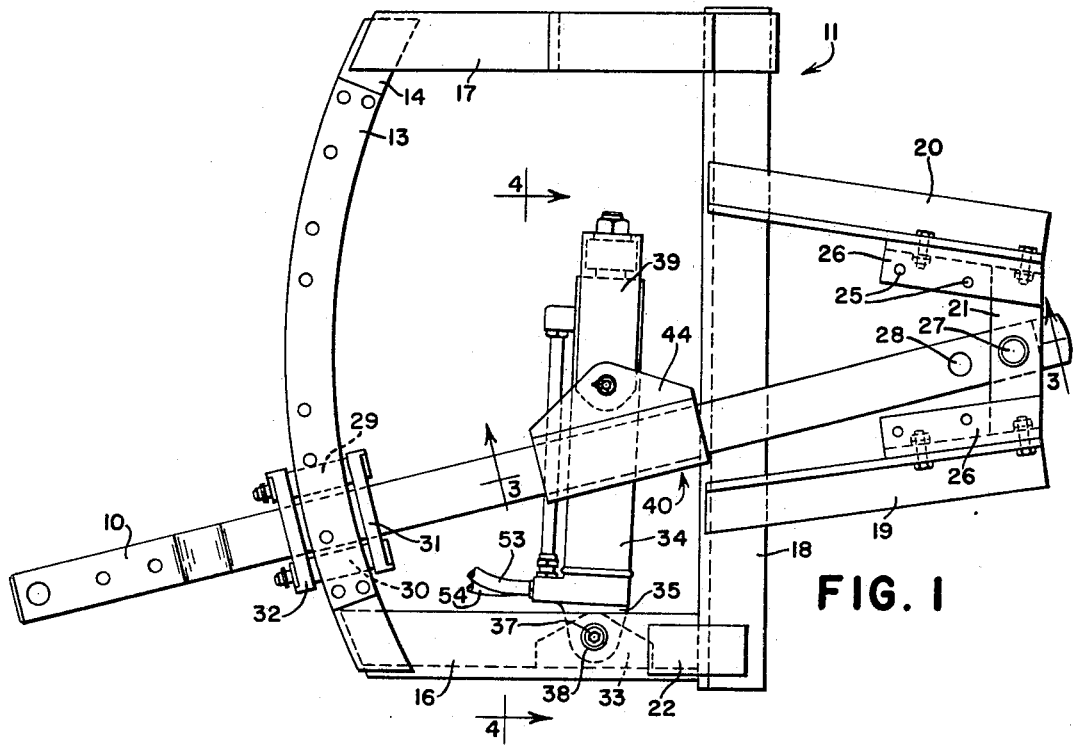
FIG. 1 is a top plan view of a power operated swinging drawbar constructed in accordance with the principles of the present invention.
FIG. 2 is a side elevation of a portion of the rear end of a tractor having a power operated swinging drawbar constructed in accordance with the principles of the present invention mounted thereon, with certain parts removed for the sake of clarity.
FIG. 3 is a cross sectional view taken substantially along the lines 3—3 of FIG. 1.
FIG. 4 is a view, partly in section, taken substantially along the lines 4—4 of FIG. 1.

With reference to the drawings, a swinging drawbar 10 is illustrated as being mounted on a supporting structure or subframe, indicated generally by the reference numeral 11, and which in turn is mounted on the rear end portion of a tractor frame 12. The drawbar supporting structure 11 includes a pair of vertically spaced and arcuate-shaped members 13 and 14 which are disposed transversely with respect to the tractor length. The transverse arcuate members 13 and 14 are held in their spaced relationship by spacer blocks 15 positioned at each end of the transverse arcuate members 13 and 14 and mounted therebetween. Longitudinally disposed supporting structure side frame members 16 and 17 have their rear end portions secured to the arcuate member 14 and their forward end portions secured to an intermediate transverse frame member 18. The outer ends of the arcuate transverse member 14 extend beyond the spacer blocks 15 to facilitate the attachment of the rear ends of the side frame members 16 and 17. The side frame members 16 and 17 are secured to the transverse arcuate member 14 and the intermediate transverse frame member 18 in any suitable manner such as welding. A pair of spaced, forwardly converging arms 19 and 20 have their rear ends secured in any suitable manner such as by welding to the intermediate transverse frame member 18 intermediate the ends thereof, and have their forward ends connected together by a pair of vertically spaced forward transverse frame members 21. For a reason which will be more apparent later, the side frame member 16 will be subjected to large forces, and, therefore, if desired, the junction between the side frame member 16 and the intermediate transverse frame member 18 can be strengthened by a reenforcement plate 22 which is welded or otherwise suitably secured to both the side frame member 16 and the intermediate transverse frame member 18.

The drawbar supporting structure is attached to the tractor frame 12 by a pair of standards 23 which are secured to each end of the transverse arcuate member 13 and to the end of the tractor frame 12 on each side of the conventional PTO 24. The forward end of the drawbar supporting structure is secured to the tractor frame 12 by bolts which extend through openings 25 provided in mounting plates 26 which are secured to the forward ends of the arms 19 and 20.

The forward end of the swinging drawbar 10 is pivoted between the forward transverse frame members 21 by a removable pivot pin 27 which extends through suitable openings provided in the forward transverse frame members 21 and either one of a pair of longitudinally spaced openings 28 provided in the drawbar 10. The drawbar 10 is provided with more than one mounting opening 28 to facilitate changes in the drawbar length. An intermediate portion of the drawbar 10 extends between the transverse arcuate members 13 and 14, and is carried therebetween by a pair of rollers 29 and 30. The rollers 29 and 30 are secured to the drawbar 10 and maintained in position between the arcuate transverse members 13 and 14 by a pair of mounting brackets 31 and 32 which are slidably mounted on the drawbar 10 and have a vertical dimension which is greater than the distance between the transverse arcuate members 13 and 14.

The longitudinally disposed side frame member 16 is constructed from angle iron and has a hydraulic actuator mounting bracket 33 secured on its depending leg. The cylinder end of a hydraulic actuator 34 is provided with a pair of mounting brackets 35 and 36 and is pivotally mounted on the longitudinally disposed side frame member 16 by a pivot pin 37 which extends through openings provided in the mounting brackets 33, 35, and 36. An opening 38 provided in the horizontally extending leg of the side frame member 16 facilitates the removal and insertion of the pivot pin 37.

The actuator rod is secured to the swinging drawbar 10 by an L-shaped link 39 pivoted to a box-like saddle indicated generally at 40 which is slidably mounted on the drawbar 10. The short leg of the L-shaped link 39 is vertically disposed and is provided with a tapered opening 41 which receives the tapered end 42 of the actuator rod and is held thereon by a nut 43. The long leg of the L-shaped link 39 is horizontally disposed and extends back along a length of the actuator rod and cylinder. The free end of the long leg of the L-shaped link 39 is pivotally mounted between spaced brackets 44 and 45 mounted on the saddle 40 by a pivot pin 46 which extends through suitable openings provided in the brackets 44 and 45 and the free end of the long leg.

The box-like saddle 40 consists of opposed side walls 47 and 48, a top wall 49, and a bottom wall 50. The bottom wall of the saddle 40 has an integral extension 51 which extends along the entire forward length of the drawbar 10 and is provided with an opening 52 at its forward end which receives the lower end of the pivot pin 27. The extension 51 is provided with only a single opening to receive the pivot pin 27 so that if the length of the drawbar 10 is varied by inserting the pivot pin 27 through a different opening 28, the saddle 40 will be slid along the length of the drawbar 10 and its position with respect to the hydraulic actuator 34 will be maintained.

The hydraulic actuator 34 is of the two-way type so that the rod can be positively extended or retracted by supplying an exhausting fluid through the lines 53 and 54 which are connected to the conventional tractor hydraulic system. When fluid pressure is supplied through the line 53, the actuator rod will be extended and will move the swinging drawbar away from the position illustrated in FIG. 1, and toward the opposite side. The forward half of the longitudinally disposed side frame member 17 is upwardly offset from the rearward half so that the actuator rod can be extended beyond the side frame member 17 without making contact therewith. Supplying fluid pressure through the hydraulic line 54 will cause the actuator rod to be retracted and will move the swinging drawbar back to the position illustrated in FIG. 1. Since the length of the hydraulic actuator is not limited by the space available between the drawbar and the tractor wheel, the swinging movement of the drawbar is not limited by the length of the actuator stroke, but only by engagement between one of the spacer blocks 15 and a corresponding one of the rollers 29 or 30. Should it be desired to change the length of the drawbar, it is only necessary to remove the pivot pin 27, slide the drawbar forward, and insert the pivot pin 27 through the rear opening 28.

While only a single preferred embodiment of the invention has been described and illustrated, it is not intended that the invention should be so limited since various modifications well within the scope of the invention will be apparent to those skilled in the art.

We claim:

1. In combination with a tractor having a rearwardly extending pivotal drawbar and a drawbar supporting structure including a transverse member secured to the rear end portion of the tractor and at least one longitudinal frame member positioned to the side of said drawbar and having its rear end portion secured to said transverse member, a drawbar control comprising: a hydraulic actuator having a cylinder end and a rod end, said actuator extending transversely and having its cylinder end attached to said frame member remotely from said transverse member, a bracket on said drawbar, and L-shaped link means, the short leg of the L-shaped link means being vertically disposed and secured to the rod end of said actuator, and the long leg of the L-shaped link means being horizontally disposed along the length of said actuator rod and cylinder and attached to said bracket.

2. A power operated swinging drawbar for attachment to a tractor comprising: a drawbar mounting structure including a forwardy disposed, transversely positioned drawbar mounting member, a rearwardly disposed, transversely positioned drawbar supporting member, a pair of spaced, longitudinally disposed side members positioned intermediate said drawbar mounting and supporting members, means to attach said drawbar mounting structure to a tractor, an elongated drawbar having its forward end pivotally attached to said drawbar mounting member and carried intermediate its length by said drawbar supporting member, a drawbar control means including a transversely disposed hydraulic actuator having its cylinder end attached to one of said side members, a bracket mounted on said drawbar, link means connected between said bracket and the rod end of said actuator whereby extension and retraction of the actuator rod will swing said drawbar from side to side, and a portion of the other of said side members being offset upwardly from the remainder thereof whereby the actuator rod can be extended beyond said other side member.

3. A power operated swinging drawbar as set forth in claim 1 wherein the cylinder end of said hydraulic actuator is pivotally attached to said frame member and said link means is pivotally attached to said bracket.

4. In combination with a tractor having a rearwardly extending pivotal drawbar and a drawbar supporting structure including a transverse member secured to the rear end portion of the tractor and at least one longitudinal frame member positioned to the side of said drawbar and having its rear end portion secured to said transverse member, a drawbar control comprising: a hydraulic actuator having a cylinder end and a rod end, said actuator extending transversely and having its cylinder end attached to said frame member remotely from said transverse member, a bracket slidably mounted on said drawbar, means for securing said bracket in any one of a plurality of adjusted positions along the length of the drawbar, and link means connected between said bracket and the rod end of said actuator whereby operation of said hydraulic actuator will swing said drawbar from side to side.

References Cited

UNITED STATES PATENTS

| | | | |
|---|---|---|---|
| 2,158,316 | 5/1939 | Alexander | 280—499 |
| 2,600,016 | 6/1952 | Miller | 280—468 |
| 2,853,315 | 9/1958 | Hyman | 280—468 |
| 2,947,551 | 8/1960 | Reimers | 280—499 |
| 3,398,975 | 8/1968 | Roberts | 280—468 |

LEO FRIAGLIA, Primary Examiner

U.S. Cl. X.R.

172—325; 280—499